United States Patent
Previdi et al.

(10) Patent No.: US 7,554,921 B2
(45) Date of Patent: Jun. 30, 2009

(54) METHOD AND APPARATUS FOR GENERATING ROUTING INFORMATION IN A DATA COMMUNICATION NETWORK

(75) Inventors: Stefano Benedetto Previdi, Wavre (BE); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 830 days.

(21) Appl. No.: 10/685,622

(22) Filed: Oct. 14, 2003

(65) Prior Publication Data

US 2005/0078610 A1    Apr. 14, 2005

(51) Int. Cl.
   *H04J 3/14* (2006.01)

(52) U.S. Cl. .................................. 370/238; 370/400

(58) Field of Classification Search .............. 370/400, 370/255, 238, 237, 238.1, 230.1, 231, 252, 370/253, 256, 258, 254, 235, 248, 251, 389, 370/411, 394
See application file for complete search history.

(56) References Cited

U.S. PATENT DOCUMENTS

| | | | |
|---|---|---|---|
| 4,987,536 A * | 1/1991 | Humblet | 709/241 |
| 5,243,592 A | 9/1993 | Perlman et al. | |
| 5,253,248 A | 10/1993 | Dravida et al. | |
| 5,265,092 A | 11/1993 | Soloway et al. | |
| 5,754,543 A * | 5/1998 | Seid | 370/351 |
| 5,825,772 A | 10/1998 | Dobbins et al. | |
| 5,999,286 A | 12/1999 | Venkatesan | |
| 6,002,674 A | 12/1999 | Takei et al. | |
| 6,032,194 A | 2/2000 | Gai et al. | |
| 6,044,075 A | 3/2000 | Le Boudec et al. | |
| 6,075,631 A | 6/2000 | Bala et al. | |
| 6,098,107 A * | 8/2000 | Narvaez-Guarnieri et al. | 709/239 |
| 6,128,750 A | 10/2000 | Espy et al. | |
| 6,148,410 A | 11/2000 | Baskey et al. | |
| 6,185,598 B1 | 2/2001 | Farber et al. | |
| 6,243,754 B1 | 6/2001 | Guerin et al. | |
| 6,256,295 B1 | 7/2001 | Callon | |
| 6,321,271 B1 | 11/2001 | Kodialam et al. | |

(Continued)

OTHER PUBLICATIONS

Notification of Transmittal of the International Search Report and the Written Opinion of the International Searching Authority, or the Declaration as received in corresponding International application No. PCT/US06/06238.

(Continued)

*Primary Examiner*—Brenda Pham
(74) *Attorney, Agent, or Firm*—Hickman Palermo Truong & Becker LLP

(57) ABSTRACT

A method and apparatus are disclosed for generating routing information in a data communications network. A first network element (such as a router) receives information relating to a second network element, such as another node or a network link. In response, the first network element determines whether the information relating to the second network element indicates a change in the network. When information relating to a second network element indicates a change in the network, the first network element determines a new shortest path through the network from the first network element for each network element in the network. After a delay, the first network element updates routing information for the first network element based on the new shortest path for the first network element. Preferably the delay is proportional to the distance of the first network element from the second network element.

24 Claims, 9 Drawing Sheets

U.S. PATENT DOCUMENTS

| | | | |
|---|---|---|---|
| 6,356,546 | B1 | 3/2002 | Beshai |
| 6,389,764 | B1 | 5/2002 | Stubler et al. |
| 6,449,279 | B1 | 9/2002 | Beiser et al. |
| 6,535,481 | B1 | 3/2003 | Andersson et al. |
| 6,578,086 | B1 | 6/2003 | Regan et al. |
| 6,668,282 | B1 | 12/2003 | Booth et al. |
| 6,697,325 | B1 | 2/2004 | Cain |
| 6,704,320 | B1 * | 3/2004 | Narvaez et al. ............ 370/408 |
| 6,711,125 | B1 | 3/2004 | Walrand et al. |
| 6,778,531 | B1 | 8/2004 | Kodialam et al. |
| 6,829,215 | B2 | 12/2004 | Tornar |
| 6,879,594 | B1 | 4/2005 | Lee et al. |
| 6,928,484 | B1 * | 8/2005 | Huai et al. ................. 709/239 |
| 6,944,131 | B2 | 9/2005 | Beshai et al. |
| 6,950,870 | B2 | 9/2005 | Beaulieu |
| 6,982,951 | B2 | 1/2006 | Doverspike et al. |
| 6,996,065 | B2 * | 2/2006 | Kodialam et al. .......... 370/238 |
| 7,016,313 | B1 * | 3/2006 | Harper ...................... 370/254 |
| 7,058,016 | B1 * | 6/2006 | Harper ...................... 370/238 |
| 7,065,059 | B1 | 6/2006 | Zinn |
| 7,099,286 | B1 | 8/2006 | Swallow |
| 7,113,481 | B2 | 9/2006 | Elie-Dit-Cosaque et al. |
| 7,158,486 | B2 * | 1/2007 | Rhodes ...................... 370/256 |
| 7,248,579 | B1 | 7/2007 | Friedman |
| 7,292,581 | B2 | 11/2007 | Finn |
| 7,330,440 | B1 | 2/2008 | Bryant et al. |
| 2002/0037010 | A1 | 3/2002 | Yamauchi |
| 2002/0093954 | A1 | 7/2002 | Weil et al. |
| 2002/0116669 | A1 | 8/2002 | Jain |
| 2002/0172157 | A1 * | 11/2002 | Rhodes ...................... 370/238 |
| 2003/0079040 | A1 | 4/2003 | Jain et al. |
| 2003/0110287 | A1 | 6/2003 | Mattson |
| 2004/0038671 | A1 * | 2/2004 | Trayford et al. .......... 455/414.3 |
| 2004/0085894 | A1 | 5/2004 | Wang et al. |
| 2004/0117251 | A1 | 6/2004 | Shand |
| 2004/0151181 | A1 | 8/2004 | Chu et al. |
| 2005/0031339 | A1 | 2/2005 | Qiao et al. |
| 2005/0038909 | A1 * | 2/2005 | Yoshiba et al. .............. 709/241 |
| 2006/0018253 | A1 | 1/2006 | Windisch et al. |
| 2006/0221962 | A1 | 10/2006 | Previdi et al. |
| 2007/0011284 | A1 | 1/2007 | Le Roux et al. |
| 2007/0038767 | A1 | 2/2007 | Miles et al. |

OTHER PUBLICATIONS

Pending claims in PCT/US06/06238.

Wang, Zheng et al., "Shortest Path First with Emergency Exits," ACM 089791-405-8/90/0009/0166, 1990, pp. 166-176.

International Searching Authority, International Search Report, PCT/US04/33827, dated Mar. 28, 2005, 8 pages.

Current Claims, PCT/US04/33827, 6 pages.

U.S. Appl. No. 10/323,358, filed Dec. 17, 2002, Michael Shand.

U.S. Appl. No. 10/442,589, filed May 20, 2003, Stewart Bryant et al.

Fortz, Bernard, et al., "Optimizing OSPF/IS-IS Weights in a Changing World," IEEE JSAC Special Issue on Advances in Fundamentals of Network Management, Spring 2002, pp. 1-31.

Thorup, Mikkel, "Fortifying OSPF/IS-IS Against Link-failure," AT&T Labs-Research, Shannon Laboratory, Florham Park, NJ, Sep. 7, 2001, pp. 1-10.

Thorup, Mikkel, et al., "Avoiding Ties in Shortest Path First Routing," AT&T Labs-Research, Shannon Laboratory, Florham Park, NJ, pp. 1-13.

Thorup, Mikkel, "OSPF Areas Considered Harmful," AT&T Labs-Research, Florham Park, NJ, Apr. 22, 2003, pp. 1-9.

Doyle J, CCIE Professional Development: Routing TCP/IP vol. 1, p. 501-507, Cisco Press 1998.

Dijkstra E.W., "A note on two problems in connexion with graphs," Numerische Mathematik, 1 (1959), S. 269-271.

ISO/IEC 10589: "Information technology—Telecommunications and information exchange between systems—Intermediate System to Intermediate System intra-domain routeing information exchange protocol for use in conjunction with the protocol for providing the connectionless-mode network service", (ISO 8473), Second edition, Nov. 15, 2002, 208 pages.

International Searching Authority, "Notification of Transmittal of the International Search Report and the Written Opinion of the International Searching Authority, or the Declaration", international application No. pct/us2006/28083, Received Nov. 30, 2007, 11 pages.

Claims, international application No. pct/us2006/28083, 3 pages.

Thorup, Michael, "Fortifying OSPF/IS-IS against link-failure", Sep. 2007, 10 pages.

Wang, Zheng et al., "Shortest Path First with Emergency Exists", ACM, 1990, 10 pages.

Karn, "Improving Round Trip Time Estimates in Reliable Transport Protocols", ACM, Transaction on Computer Systems, 1987, 8 pages.

State Intellectual Property Office of the People's Republic of China, "The First Office Action", (Non-translated copy included as well), filling No. 200480026214.0, dated Jan. 9, 2009, 7 pages.

Current Claims, for foreign application No. PCT/US2004/033827, 5 pages.

* cited by examiner

METHOD AND APPARATUS FOR GENERATING ROUTING INFORMATION IN A DATA COMMUNICATION NETWORK

FIELD OF THE INVENTION

The present invention generally relates to routing of data in a network. The invention relates more specifically to a method and apparatus for generating routing information in a data communications network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of links (communication paths such as telephone or optical lines) and nodes (usually routers directing the packet along one or more of a plurality of links connected to it) according to one of various routing protocols.

In the network, some nodes represent end systems (such as printers, fax machines, telephones, PC's etc) whereas other nodes represent network devices (e.g. switches, routers etc). The data packets are sent around the network from a source to a destination in accordance for example with routing information shared among the nodes of the network. As the network comprises a plurality of interconnected nodes, the network is fairly robust. Should a node or link fail for any reason, the network dynamically configures to re-route data so as to avoid the failed node. When a node or link comes into existence on a network, for instance through repair or by addition of a new node, the network dynamically converges to a so-called converged state wherein all the routers of the network have common routing information.

One class of routing protocol relying on shared information is the link state protocol. Examples of link state protocols are the Intermediate System-to-Intermediate System (IS-IS) protocol and the Open Shortest Path First (OSPF) protocol. The link state protocol relies on a routing algorithm resident at each node. Each node on the network advertises, throughout the network, links to neighboring nodes and provides a cost associated with each link which can be based on any appropriate metric such as link bandwidth or delay and is typically expressed as an integer value. A link may have an asymmetric cost, that is, the cost in the direction AB along a link may be different from the cost in a direction BA.

Based on the advertised information in the form of a link state packet (LSP) each node constructs a link state database (LSDB) which is a map of the entire network topology and from that constructs generally a single optimum route to each available node A link can be thought of as an interface on a router. The state of the link is a description of that interface and of its relationship to its neighboring routers. A description of the interface would include, for example, the IP address of the interface, the mask, the type of network it is connected to, the router connected to that network and so on. The collection of all these link-states for the whole network forms the link-state database. Link state protocols use a link state algorithm to build and calculate the shortest path to all known destinations. The algorithms themselves are quite complicated but the following provides a high level simplified way of looking at the various steps of a link state algorithm. Upon initialization or due to any changing routing information, a router will generate a link state advertisement packet (LSP). This advertisement represents the collection of all link states on that router. All routers exchange LSPs by means of flooding. Each router that receives a link state update, stores a copy in its link state database and then propagates the update to other routers with a propagation time of the order of 20 ms. After the database of each router is completed, the router will calculate the shortest (lowest cost) path tree to all designations and use this information to form an IP routing table. In some instances two or more routers of equal cost present themselves, termed an "equal cost path split".

One appropriate algorithm is a shortest path first (SPF) algorithm. As a result a "spanning tree" is constructed, rooted at the node and showing an optimum path including intermediate nodes to each available destination node. Conversely, a "reverse spanning tree" can be constructed showing the optimum path to a given node from all nodes from which it is reachable. Because each node has a common LSDB (other than when advertised changes are propagating around the network) any node is able to compute the spanning and reverse spanning tree rooted at any other node. The results of the SPF are stored in a routing table (also known as a routing information base (RIB)) and, based on these results, the forwarding information base (FIB) or forwarding table is updated with an update time of the order of 500 ms to control forwarding of packets appropriately.

In link state protocols, when a link or a node fails and is subsequently repaired, or there is some other change to the network such as a change of link cost, the routers involved with the repaired part of the network then have to re-establish convergence. This is achieved by the router(s) advertising themselves or the change throughout the network area. However during topology change there will be a short period of time in which LSDBs, RIBs and, critically, FIBs across a network become inconsistent as information about a change is propagated through the network. Routes generated during this period of inconsistency may result in routing loops, which persist until the databases have converged (at which point there should be no loops, by definition). As an example, if a first node sends a packet to a destination node via a second node, comprising the optimum route according to the first node's SPF, a situation can arise where the second node, according to it's SPF (based on a different LSDB from that of the first node) determines that the best route to the destination node is via the first node and sends the packet back. The loop can happen where the first node, according to its LSDB believes that a link cost is lower than the second node does, according to its LSDB. This can continue indefinitely although usually the packet will have a maximum hop count after which it will be discarded. Such a loop can be a direct loop between two nodes or an indirect loop around a circuit of nodes. Re-convergence will typically take several hundred milliseconds and hence may cause disruption for periods greater than that originally caused by the failure.

One solution for avoiding loops during a routing transition is described in co-pending patent application Ser. No. 10/323, 358, filed 17 Dec. 2002, entitled "Method and Apparatus for Advertising a Link Cost in a Data Communications Network" of Michael Shand (hereinafter "Shand"), the entire contents of which are incorporated by reference for all purposes as if fully set forth herein. According to the solution put forward in Shand, when a node detects deactivation of an adjacent link or node, then instead of advertising the failure of the component, for example by simply removing the link from the LSP, the node that detects deactivation increments the associated link costs and advertises the incremented cost. As a result even when nodes have different LSDBs because of finite propagation and processing time of the LSP carrying the incremented link cost, loops are not set up in the remainder of the network. Once all nodes have updated their LSDBs, the detecting node increments the cost and advertises the incremented cost again. However in some circumstances it is desirable to converge on a common view of a network more quickly than is permitted by this incremental approach.

One alternative approach to dealing with link failure is described in document "Fortifying OSPF/IS-IS Against Link-Failure" by Mikkel Thorup ("Thorup") which is available at the time of writing on the file "If_ospf.ps" in the directory "~mthorup\PAPERS" of the domain "research.att.com" on the World Wide Web. The approach of Thorup is to pre-compute the SPF at each node for each possible link failure. When a link failure is advertised the node forwards along its pre-computed updated path whilst updating the LSDB in the background.

Various problems arise with the approach. Thorup requires increased storage and computing to deal with all possible routes around all possible failures, as well as extra forwarding code requirements. Significantly Thorup does not address the problem of loop formation during a transition. A further solution for avoiding loops during a routing transition is described in co-pending patent application Ser. No. 10/442,589, filed May 20, 2003, entitled "Method and Apparatus for Constructing a Transition Route in a Data Communications Network" of Stewart Bryant et al. ("Bryant"), the entire contents of which are incorporated by reference for all purposes as if fully set forth herein. According to the solution put forward in Bryant, when a network component fails, upstream nodes construct transition routes to destinations which would otherwise be reachable via the failed component. The transition routes are constructed by tunneling packets for the destination node to an intermediate node in an intersection of a first set of nodes reachable from the repairing node without traversing the failed component and a second set of nodes from which the destination node is reachable without traversing the first component. Although this is also a very effective solution, it requires installation of a large number of tunnels.

Based on the foregoing, there is a clear need for a method of preventing loops occurring in a network during convergence of the network.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
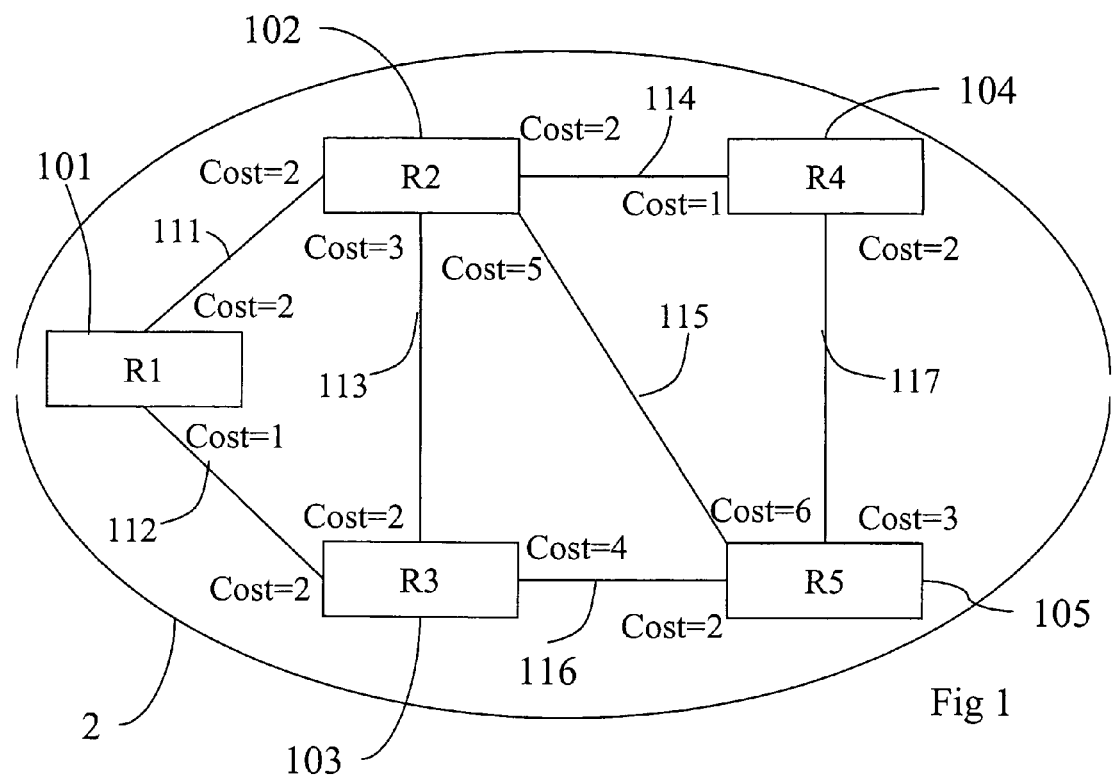
FIG. 1 shows an embodiment of a network.

A method and apparatus for network convergence is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
    3.0 Method of generating routing information
    4.0 Implementation Mechanisms-Hardware Overview
    5.0 Extensions and Alternatives 1.0 General Overview The needs identified in the foregoing Background, and other needs and objects that will become apparent for the following description, are achieved in the present invention, which comprises, in one aspect, a method for generating routing information in a data communications network. The data communications network includes nodes and links as elements. A first network element receives information relating to a change in the network at a second network element. The first network element identifies the sequence for updating routing information at each element in the network. The first network element updates its routing information in sequence. In addition, a first network element (such as a router) receives information relating to a second network element, such as another node or a network link. In response, the first network element determines whether the information relating to the second network element indicates a change in the network. When information relating to a second network element indicates a change in the network, the first network element determines a new shortest path through the network from the first network element for each network element in the network. After a delay, the first network element updates routing information for the first network element based on the new shortest path for the first network element.

In other aspects, the invention encompasses a computer apparatus and a computer-readable medium configured to carry out the foregoing steps.

The method described herein can be implemented according to any appropriate routing protocol. Generally link state protocols such as Intermediate System to Intermediate System (IS-IS) or Open Shortest Path First (OSPF) are appropriate protocols. Link state protocols of this type will be well understood by the person skilled in the art and are not described in detail here. However alternative protocols can also be used to implement the method. Where IS-IS terminology is used to illustrate the method and apparatus this is for illustrative purposes only and it is not intended that the method be limited to this protocol.

2.0 Structural and Functional Overview

A data communications network comprises a plurality of interconnected sites. Traffic between sites is routed from the source to a destination via nodes of the network. Due to various factors (for instance excessive network traffic, hardware failure or software failure), nodes may enter a failure mode, during which time data routed to that node is not routed onwards by that node.

In addition to failure mode, a network change can take place when a link cost is increased or decreased, for example as a result of a network administrator intervention and in any of these cases the possibility arises that temporary de-synchronization of the network as the change is propagated through the network can give rise to loops. Other possible network changes comprise introduction of a new router (effectively corresponding to a link cost decrease from "infinity") or removal of a router (effectively corresponding to a link cost increase to "infinity").

FIG. 1 is an illustrative network diagram showing an example of a data communications network having as network elements nodes and links, which can be the internet or a sub-network such as a routing domain or a virtual network. The network as depicted in FIG. 1 comprises five nodes R1-R5, (respectively indicated by reference numerals 101, 102, 103, 104, 105) each of which is a router, within an autonomous area 2. FIG. 1 shows the interfaces for each router, the attached networks for each interface Net 1, Net 2, . . . Net 7 (respectively indicated by reference numerals 111, 112, 113, 114, 115, 116, 117) and the cost to reach each of these networks from the router. Each router in the network includes software that enables a router to maintain a network map the (LSDB). The Link State Database is updated whenever an area of the network topology changes. If a router has interfaces on multiple areas, an LSDB is maintained for each separate area. The LSDB is, for example, calculated periodically e.g. every 10 seconds or so. If no changes have occurred to the area's topology, no changes are made to the area's LSDB.

The LSDB contains entries for all the networks to which each router in an area is connected. It also assigns an outgoing cost metric to each network interface of a router. This metric measures the cost of sending traffic through an interface to the connected network. By assigning costs, router preferences can be set based on line cost or line speed.

The entries in the LSDB are based on information sent in Link State packets which include information generated by the router to describe the reachability of the router. Each Link State packet contains the following information: the interfaces on the router, the attached networks for that router and the costs to reach each of these networks. A network is said to be converged when the LSDB is the same for all routers in the area. After the LSDB has reached the converged state, each router calculates the shortest path through the network for each network and each router. A Shortest Path First (SPF) Tree (SPT) is calculated and the information stored. Each router maintains its own SPT.

After the SPT is built, a routing table is calculated by determining the lowest-cost route for each destination network. Routing tables are calculated locally at each router and the FIB updated accordingly.

The network of FIG. 1 results in a LSDB as shown in Table 1 below:

TABLE 1

| Router | Attached Network | Network Usage Cost |
| --- | --- | --- |
| Router 1 | Net 1 | 2 |
| Router 1 | Net 2 | 1 |
| Router 2 | Net 1 | 2 |

TABLE 1-continued

| Router | Attached Network | Network Usage Cost |
| --- | --- | --- |
| Router 2 | Net 3 | 3 |
| Router 2 | Net 4 | 2 |
| Router 2 | Net 5 | 5 |
| Router 3 | Net 2 | 2 |
| Router 3 | Net 3 | 2 |
| Router 3 | Net 6 | 4 |
| Router 4 | Net 4 | 1 |
| Router 4 | Net 7 | 2 |
| Router 5 | Net 5 | 6 |
| Router 6 | Net 6 | 2 |
| Router 7 | Net 7 | 3 |

Figure 2:
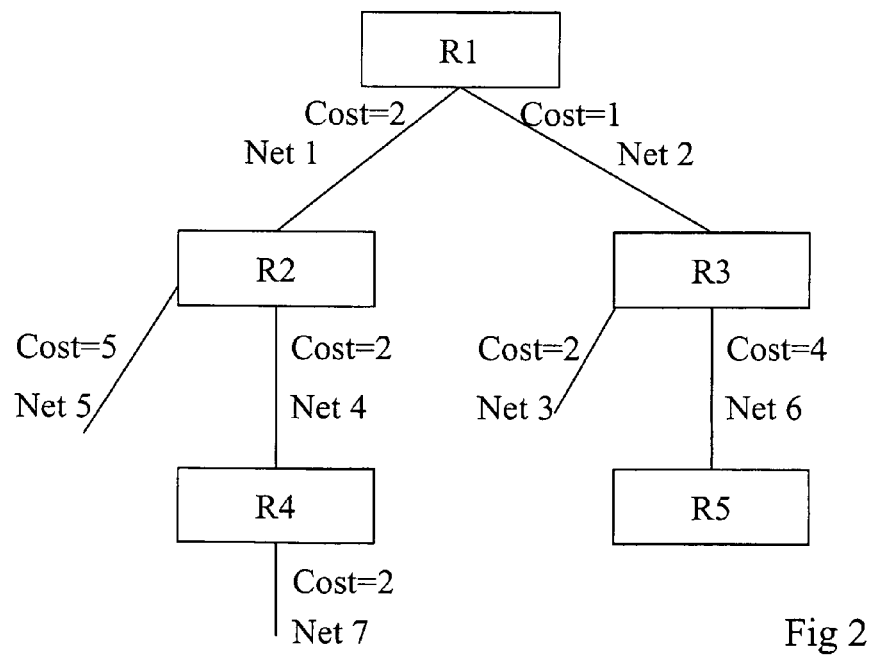
FIG. 2 shows a Shortest Path First Tree (SPT) for the network of FIG. 1.

Using this LSDB, each router calculates the SPT. FIG. 2 shows a SPT for router R1 of FIG. 1. This shows the shortest path from R1 for each network and each router. The router R1 can then calculate the R1 routing table from this SPT. An example of the routing table for Router R1 of FIG. 1 is provided in Table 2.

TABLE 2

| Network | Gateway | Interface | Metric |
| --- | --- | --- | --- |
| Net 1 | — | 1 | 2 |
| Net 2 | — | 2 | 1 |
| Net 3 | Router 3 | 2 | 3 |
| Net 4 | Router 2 | 1 | 4 |
| Net 5 | Router 2 | 1 | 7 |
| Net 6 | Router 3 | 2 | 5 |
| Net 7 | Router 2 | 1 | 6 |

One possible network change that can give rise to loops is the changing costs of a link, for example between nodes R1 and R2. While the LSP is propagating, the temporary de-synchronization of the network can cause looping as discussed in more detail above. For example if the link cost increases and node R1 updates its LSDB before node R3, then a packet forwarded from node R3 to node R1 to a destination along the link between node R1 and node R2 may be returned by node R1 back along the link to R3 if this now represents a lower cost route. As a result a loop will be set up until node R3 is updated. However the method presented herein recognizes that if node R3 were updated before node R1 in these circumstances then a loop cannot arise. This is because, in those circumstances, node R3 will forward the packet towards another node than R1 in view of the increased cost of the link between nodes R1 and R2 or node R3 will forward the packet to node R1 which, as it has not updated its LSDB to reflect the cost increase, will continue to forward the packet via node R2 towards the destination as though the network was still converged on the previous, non-increased link cost between nodes R1 and R2. In a similar manner, loops will not occur between, say node R3 and node R6 as long as node R6 is updated before node R3. As a result the method ensures that nodes update their LSDB when a link cost increase is propagated in the correct order, only after any nodes upstream thereof have updated their LSDB.

According to one approach the method uses knowledge of nodes on the "horizon", that is the furthest nodes upstream of the changed component which are affected by the change. Nodes in the network which do not forward packets to any destination via the changed component do not need to be considered and are hence effectively beyond the horizon. Accordingly it is necessary simply to identify as the affected set those nodes which would forward via the failed component. The manner of achieving this is discussed in more detail below but in overview all relevant nodes can be identified by running a reverse SPF rooted at the node downstream of the affected link to obtain the reverse spanning tree. As this can be calculated by each node on the network once it has received notification of the change, each node can identify whether it is affected by the change and if so the extent of the delay that must be instigated prior to updating the routing information in their FIB to reflect the change. The calculation is based on the network prior to the change—i.e. the lower cost version. This ensures that all nodes that might continue to forward incorrectly along the altered link prior to update are updated in the correct sequence.

A similar method can be implemented for cost decreases. For example, a change in network topology giving rise to an effective cost decrease may arise for various reasons, e.g. by the installation of a new router in the network or because a router had for some reason (e.g. through repair or because of a fault) been offline and has come back online. Where a node fails and is then subsequently repaired, it will be necessary for that node to acquire the LSPs from its neighbors so that it can rebuild its link state database and for the rest of the nodes in the network to acquire the LSP of the changed network element. While the nodes acquire the LSPs from neighboring nodes, there will be a period of time during which each node's link state database is not consistent. Clearly this may cause problems if a packet is routed to a node since the node may not yet have received information relating to how a packet should be routed. In this case the affected set is calculated as for a cost increase but based on the network after the change, i.e. the lower cost version, once again to capture all nodes that might try to forward along the altered link during convergence.

Figure 3:
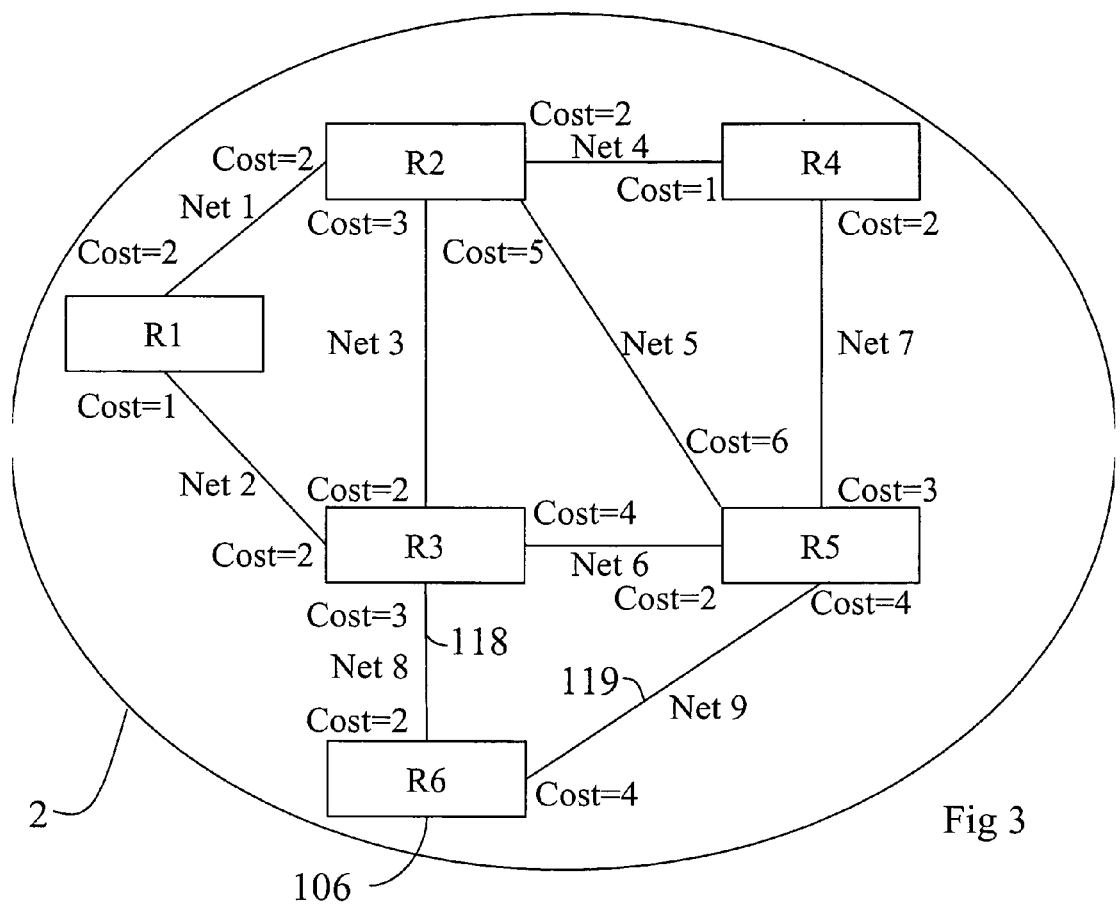
FIG. 3 shows the network of FIG. 1 with altered topology.

Consider the situation in which a router R6 (reference numeral 106) is added to the network as shown in FIG. 3 which is an illustrative network diagram showing the network of FIG. 1 with attached topology. R6 has two interfaces, one of which is attached to Net 8 (reference numeral 118) (which is also attached to an interface of R3) and the other of which is attached to Net 9 (reference numeral 119) (which is also attached to an interface of R5). The network usage cost for these new links is shown FIG. 3.

When R6 is added onto the network, R6 will flood the network with Link State information advertising its characteristics and this Link State information is received by the other routers in the network. Router R1 and its response to Link State information from R6 are used as examples in the detailed discussion of the method and its variants and optimizations, below. However, the method described below is broadly applicable to any other networks or routers that cooperate for routing packets.

3.0 Method for Generating Routing Information

The operation of an example router R1 will now be described with reference to FIG. 3 and FIG. 4 which shows a SPT for router R1 of FIG. 3 and also FIG. 5, which is a flow chart illustrating the operation of a router in response to receiving Link State information. Although this description only refers to the operation of R1, the same process may also occur at each of the nodes of any network.

At block 501, R1 receives Link State information (LSP) from R6, and at block 502 R1 inspects the Link State information to determine whether the LSP indicates that the LSP relates to a new neighbor or a known neighbor with a change in cost metric. If the LSP relates to either of these, the SPT for router R1 may need to be altered. At block 504, if the LSP relates to neither of these, the SPT for router R1 does not need to be altered.

At block 506, on determining that the LSP relates to a new neighbor or a known neighbor with a changed cost metric, the router R1 detects the type of change and commences an SPF computation without updating its Routing table.

During SPF calculation, the router has to determine whether the new adjacency has an impact on the SPT for the router. To do this, at block 508 R1 determines whether the two nodes at each side of a new link in the network are parent and child of each other in the new SPT. From FIG. 3 it can be seen that the nodes at each end of the new link Net 8 are routers R3 and R6 and that the nodes at each end of the new link Net 9 are routers R5 and R6.

Figure 4:
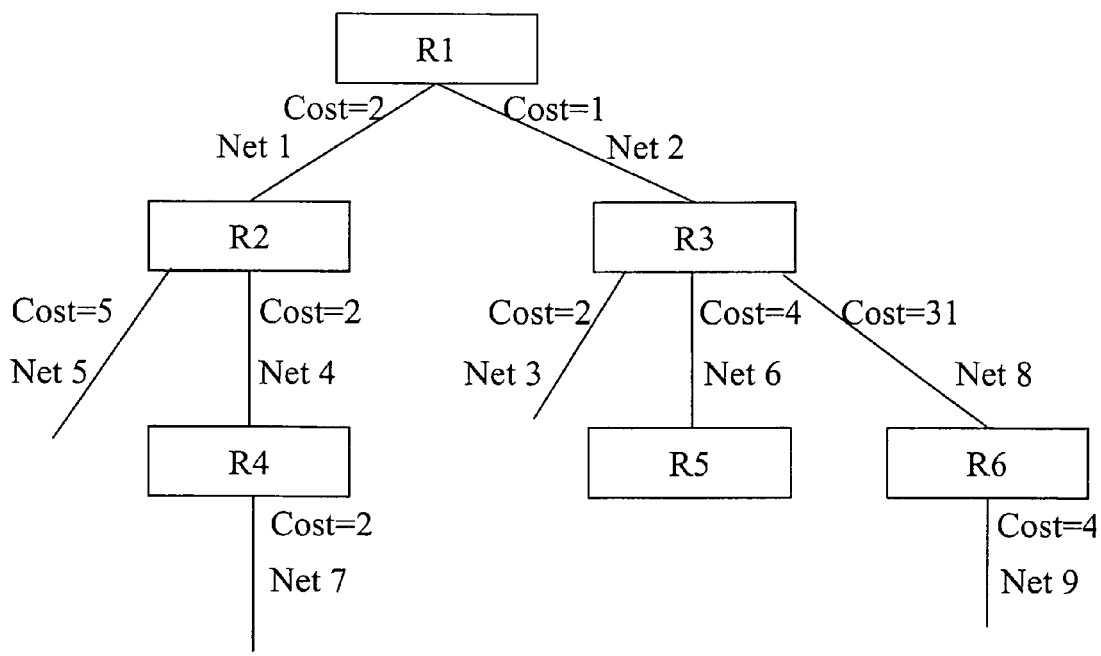
FIG. 4 shows a Shortest Path First Tree (SPT) for the network of FIG. 3.
Figure 5:
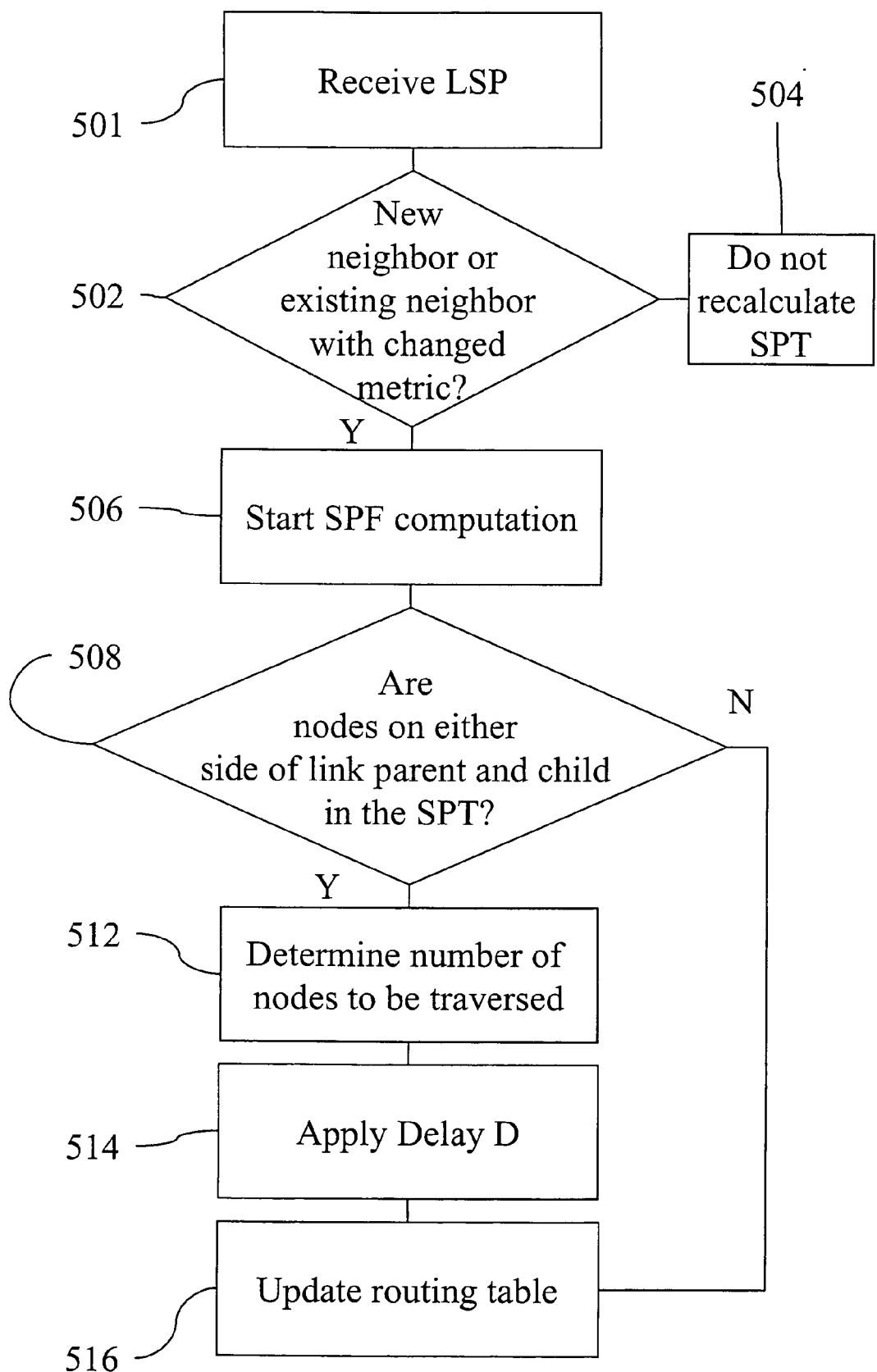
FIG. 5 is a flow diagram which illustrates a high level overview of one embodiment of a method for convergence.

FIG. 4 shows the SPT for the network shown in FIG. 3. As can be seen, this is similar to the SPT shown in FIG. 2 with the addition of R6, Net 8 and Net 9. From FIG. 4 it can be seen that the routers R3 and R6 at the ends of link Net 8 are parent and child and that routers R5 and R6 at the ends of link Net 9 are not parent and child in the new SPT.

Referring back to FIG. 5, if there is no relationship between the two nodes, the SPF for that link is not affected by the change in network topology and normal operation of the router continues by updating the routing table. In the specific example given, this means that at block 510 the routing table may be updated for the link Net 9.

If there is a relationship between the two nodes, the SPF for that link is affected by the change in network topology. R1 then inspects the branch of the SPT having the node representing the remotest node of the new link. In this specific example, the remotest node of the new link Net 8 is R6. At block 512 the router R1 determines the number of nodes traversed to reach the link (Net 8) that is newly advertised. This computation occurs during SPF computation at the time when the node remote from the link is newly discovered. The router R1 moves up the branch of the SPT from the node R6 node by node following the parent of each node until the root of the tree is reached.

This allows the computing router R1 to understand how many nodes it has to traverse to reach the nodes adjacent the link that has come up. More precisely the router determines how many nodes it is to the node remotely connected to the link. With this information, the computing node R1 can finish the SPF computation.

When the node R1 has determined its position in the SPT and the number of hops needed to traverse to reach the node R6 at the other side of the link Net 8, at block 514 it applies a routing information update delay D before updating its routing table. This delay D is proportional to the distance of the calculating router (in this case R1) to the link that has been advertised (in this case Net 8). The closer the link, the less the router will delay the updating of its routing table and FIB. The delay may be computed as follows:

$$\text{Delay} = (\text{Number of hops}) * \text{Delay value}$$

where the number of hops has been calculated (as described above) and the delay value is a configurable delay that the node uses as a reference value. In one embodiment, the delay value is configurable. The delay value may be based on one or more of the following: the propagation delay of an LSP; the minimum/maximum/average computation time per node; the CPU/memory utilization per node etc. Typically it may be of the order of a few seconds.

Applying a delay provides time for downstream neighbors in the network to converge to a state ready to continue the forwarding of traffic.

Thus, for the example shown in FIG. 4, the router R1 determines the number of nodes to the remotest node on a new link. R1 starts from R6 and counts the number of nodes (also called hops) back to the root. In this specific example, the number of hops is equal to 2. The router R1 then calculates a delay D based on the number of hops, as described above and updates its routing table once this delay has occurred.

Figure 6:
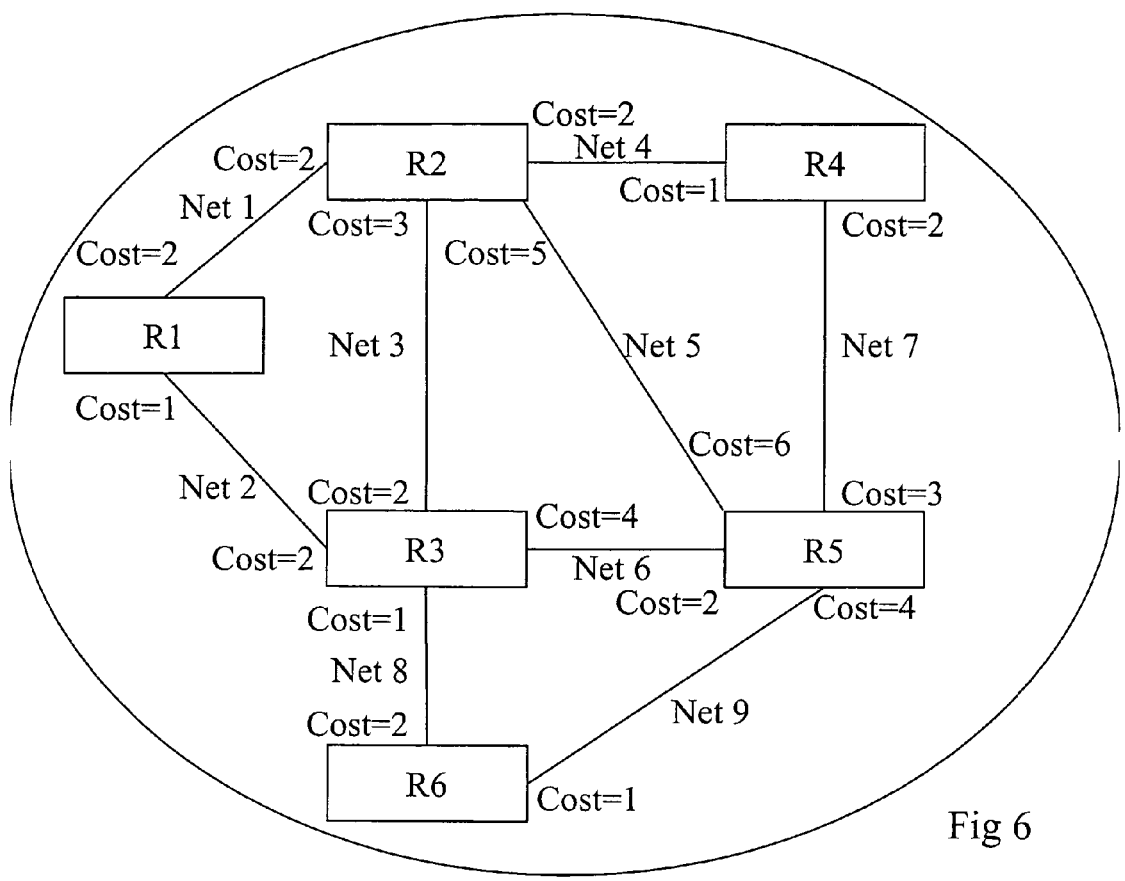
FIG. 6 shows the network of FIG. 1 with altered topology.

FIG. 6 is an illustrative network diagram showing another example of the network of FIG. 1 with a new topology. As in FIG. 3, a new router R6 is added with two network connections Net 8 and Net 9. However the cost metrics for these networks are different in FIG. 6: the cost metric for Net 8 attached to R3 is now 1 rather than 3 and the cost metric for Net 9 attached to R6 is now 1 rather than 4.

Figure 7:
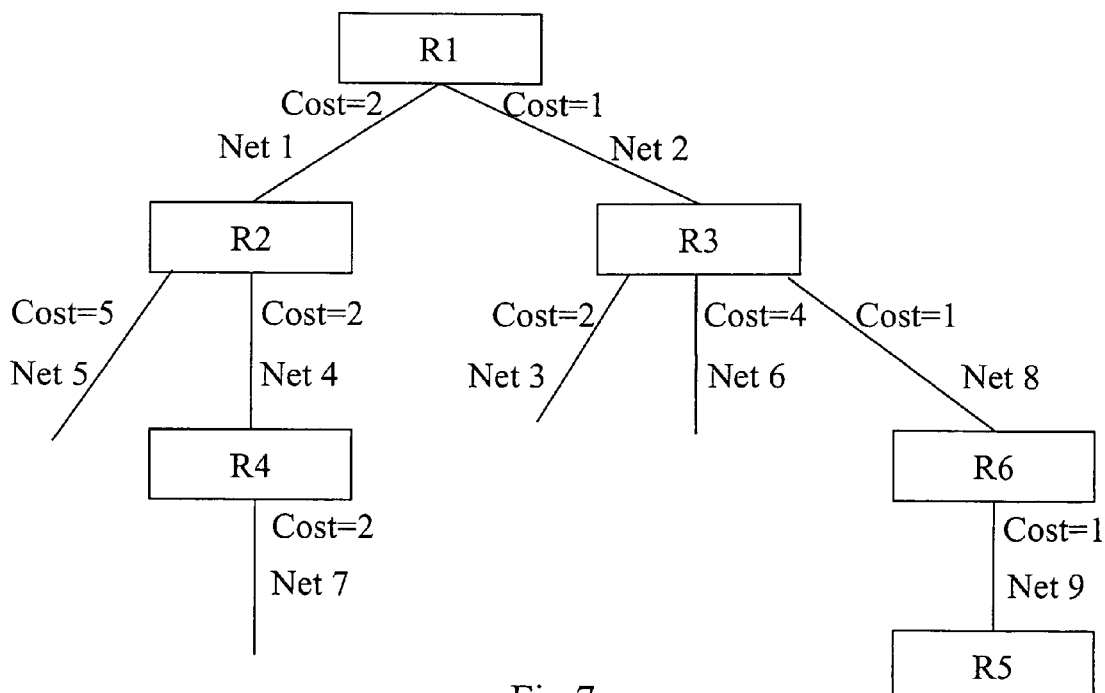
FIG. 7 shows a Shortest Path First Tree (SPT) for the network of FIG. 6.

FIG. 7 shows the SPT at node R1 for the network shown in FIG. 6. From FIG. 7 it can be seen that the routers R3 and R6 are parent and child and that routers R5 and R6 are also parent and child.

For the new link which has a node remotest from the root of the tree, the router R1 determines the number of nodes to the remotest node. Thus R1 starts from R5 and counts the number of nodes (also called hops) back to the root. In this specific example, the number of hops is equal to 3. The router R1 then calculates a delay D based on the number of hops, as described above and updates its routing table once this delay has occurred.

Such an algorithm as described is optionally not activated on initial convergence of a network but is activated once routers have reached a stable state after initial convergence.

Additional, alternative and variant approaches and optimizations will now be discussed in more detail.

Figure 8:
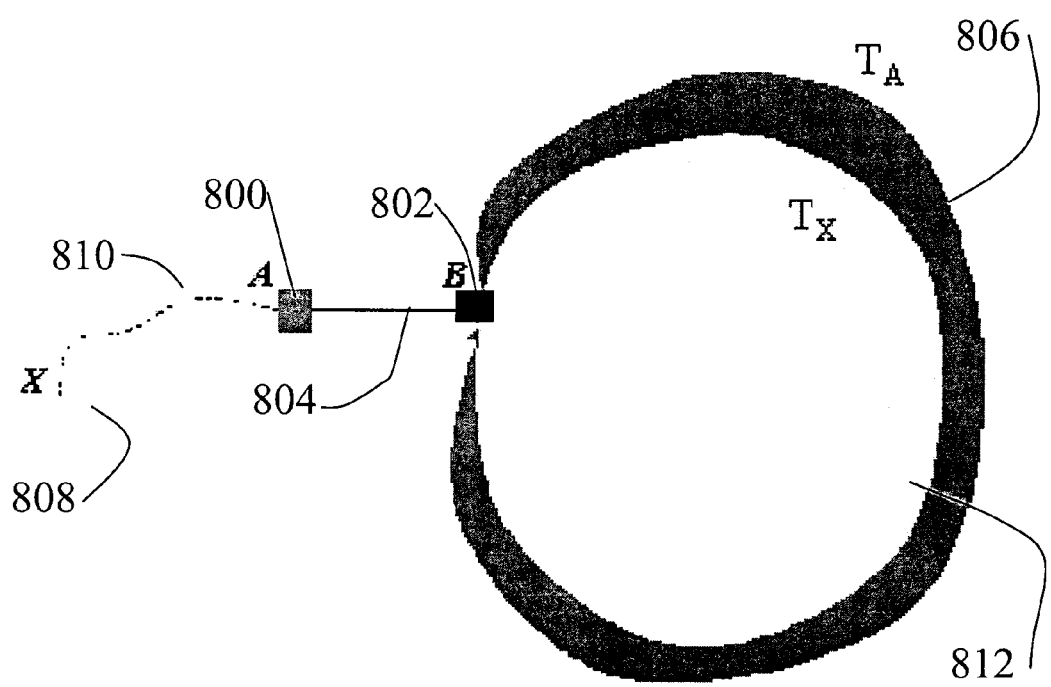
FIG. 8 shows an embodiment of a network illustrating T-space.

FIG. 8 is an illustrative network diagram showing a simplified example network. From a consideration of the network diagram of FIG. 8 it can be understood how the affected set of nodes or "horizon" is identified, that is, how to identify only those nodes in the network which could form parts of loops because of by a component change in the network. The network includes a node A, reference 800 and a node B, reference 802 joined by a link A, B 804. The traffic flowing over the link A,B is characterized by a set of destinations which are termed the T space with respect to A,B, which can be determined by running a standard SPF routed at A and only considering the sub-tree which traverses the link A, B. This gives the T space TA reference 806 with respect to A, B. All other destinations from node A are reachable by links other than link A, B. The network further includes a node X reference 808 which is joined to node A via a path designated generally 810 which can, for example, represent a plurality of nodes and links (not shown). The T space for node X with respect to link A,B representing those nodes reachable from node X via link A, B is designated $T_x$ 812. $T_x$ is a sub-set of $T_A$ such that there is no node within $T_x$ which is not contained within $T_A$. $T_x$ is once again computed by running a standard SPF routed at X and considering only the sub-tree which traverses the link A, B. For nodes further away from node A the T space with respect to link A, B will shrink, as more destinations are reached from the respective node via other routes. Accordingly for more distant nodes the T space with respect to A, B shrinks until it consists only of the node B. For some nodes on the network the T space may be an empty set meaning that there are no destinations reachable from that node which require forwarding across link A, B. This means that there are no destinations reachable from the node whose route determined at that can be affected by any change in the cost of the link A, B. The term "upstream" and "downstream" in this context are used relative to the root of the spanning tree, upstream nodes comprising child nodes. For example for a reverse spanning tree rooted at node B, node A is an upstream node but downstream of node X. Nodes in $T_x$ are downstream of node B.

As a result to determine the affected set it is necessary simply to compute the reverse spanning tree routed at B and consider only the sub-tree which traverses A, B. The nodes at the leaves of the sub-tree, that is, the child end nodes on the sub-tree, represent the nodes "furthest" from node A from which any path can be affected by any changing cost of node A, B. The affected destinations for these furthest nodes will either be node B alone or nodes downstream of and close to node B. For nodes in the sub-tree closer to node A, the set of affected destinations will be greater.

The label "T space" is arbitrary and used for convenience, and other embodiments may use any other label for the set of nodes represented.

Figure 9:
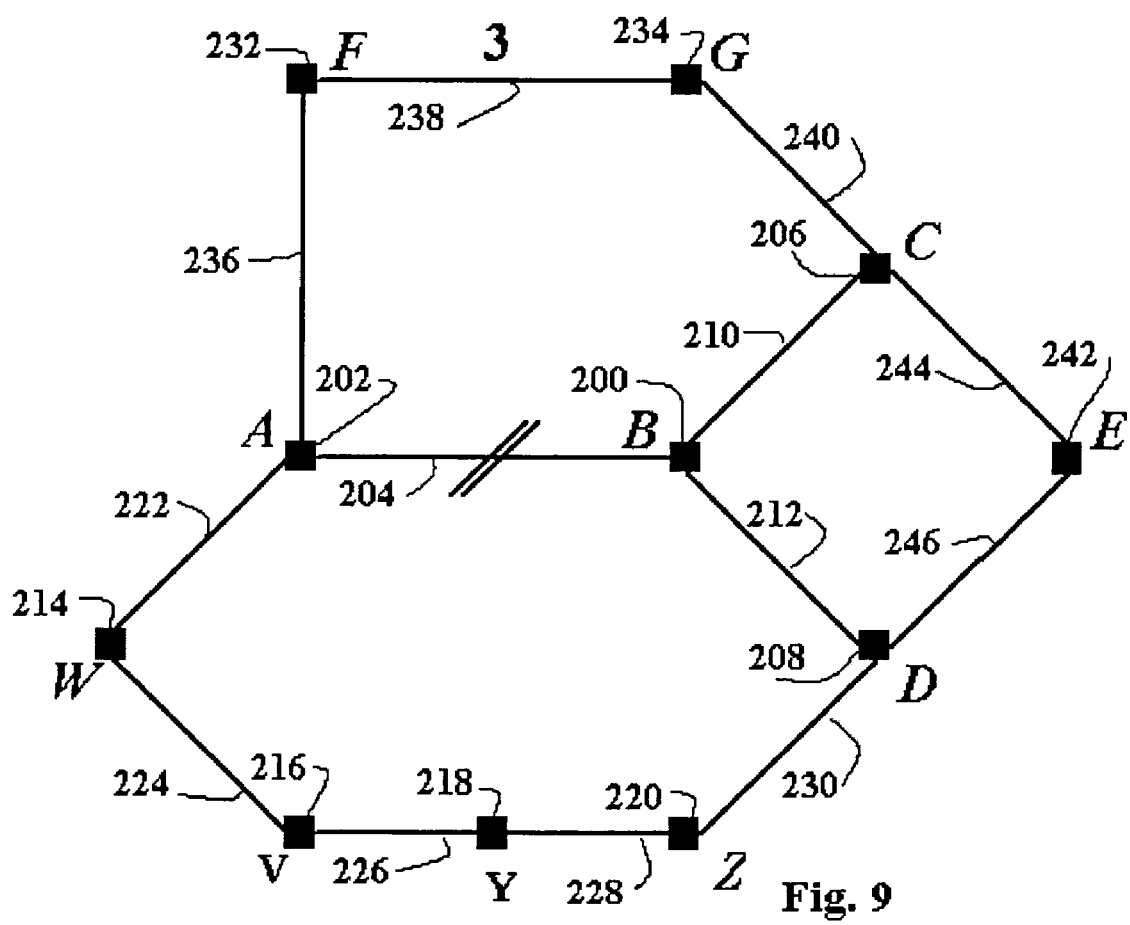
FIG. 9 shows a representation of a network that illustrates a method as described herein.

FIG. 9 shows a network diagram of an illustrative network in relation to which the method can be carried out. The network includes node B, the component to be traversed, reference 200, a neighboring node A, reference 202 and a link 204 joining them. Node B has two further neighbor nodes, nodes C and D reference numbers 206, 208 respectively joined by respective links 210, 212. Node A has an alternative path to node D via nodes W, V, Y and Z, 214, 216, 218, 220 respectively and corresponding links 222, 224, 226, 228 and 230. Node A also has an alternative path to node C via nodes F and G, 232, 234 and corresponding links 236, 238, 240. Node E, 242, is reachable by either node C or node D by respective links 244, 246. All of the links have a cost 1 except for link 238 between nodes F and G, which has a cost 3.

Figure 10:
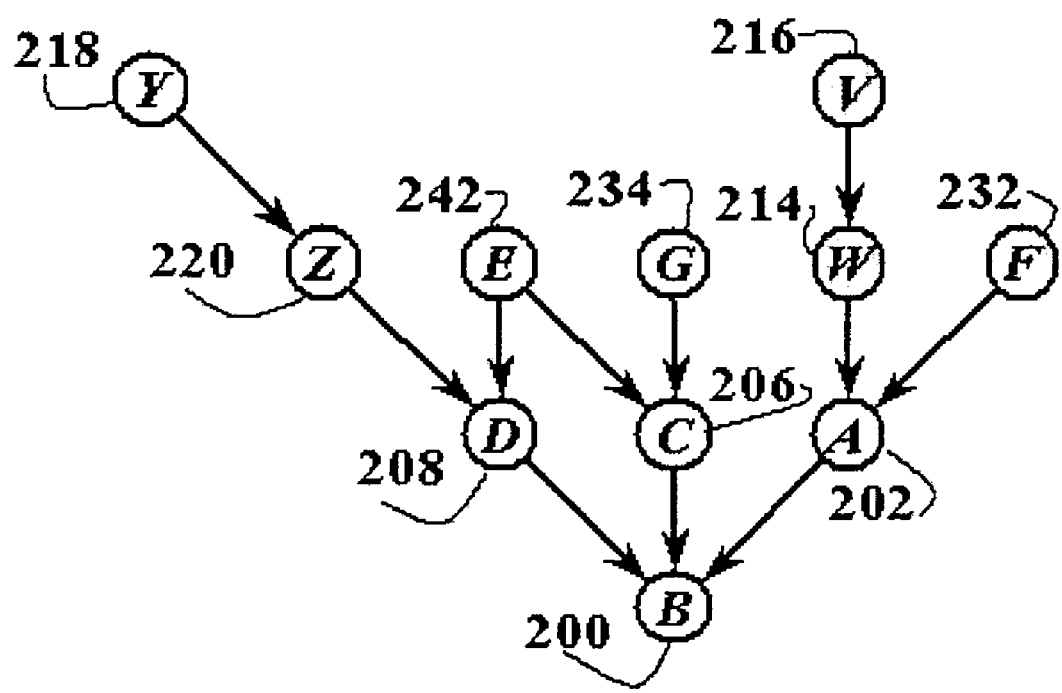
FIG. 10 shows a spanning tree diagram for a node in the network as shown in FIG. 9.

In order to determine the affected set, therefore, the reverse spanning tree is computed at node B. FIG. 10 shows a reverse spanning tree routed at node B. Nodes A, F, V and W are shown shaded in grey as they represent the nodes which send packets along link A, B. As a result the affected set is obtained with nodes F and V representing the leaves or furthest most child nodes. Accordingly the links within this reverse spanning sub-tree are the only links in the network over which traffic will flow whose path can subsequently be affected by any change in the cost of the link A, B.

In the case of equal cost path splits, that is where two or more paths of equal cost exists such that traffic may be routed over either, all equal cost path splits in the sub-tree are included.

As discussed above with reference to FIGS. 1 to 7, in the case of a cost decrease for example as a result of adding a node to the network, loops are avoided by updating the FIBs of affected nodes in order from the closest node the approach is dependent on whether a cost increase or cost decrease has occurred at the A, B link.

In the case of a cost increase, in overview the routing information of affected nodes is updated in order from the furthest affected node. In the case of a cost increase the affected nodes are those for which traffic flowing over the link prior to the change is affected. In the case where a node has more than one upstream branch, for example node A in FIG. 10, the process waits until all nodes on all upstream branches have updated. Otherwise if node A updated after node F had updated then it would be possible that node A updated before or at the same time as node W which could give rise to loops. If such sequential updating is implemented then loops cannot take place. In the first possible outcome the node in question changes its route to pass through other nodes closer to the route in which case, as they have not yet updated, the packet will continue along the route and will not return to the sending node such that no loop can occur. Alternatively the node in question changes its route to pass through nodes further from the route; as these will already have been updated then if they did return the packet to the sending node there would also be a loop after complete convergence which is impossible and so once again no loop will occur.

As a result, and in a manner similar to that discussed in relation to FIGS. 1 to 7, the proper sequence of invocation can be produced by delaying updating of the FIB by an interval representing the maximum time expected for a node to complete its route invocation or update multiplied by the number of hops from the current node to the furthest (upstream) of its children and ensuring that a node delays until all its (upstream) children have invoked their route. In the case of equal cost path splits it is necessary to delay invocation at the branching node dependent on the maximum number of hops in any of the equal cost paths.

It will be recognized that the approach described is the "safest" approach as using node B as the route of the reverse spanning tree represents the worst case destination for deciding whether a path will be affected by the A, B link cost increase. However not all paths in the reverse spanning tree will necessarily be affected. Traffic from nodes in the reverse spanning tree to destinations which are not within their T space with respect to link A, B will not be affected and in some cases a small change in the cost of the link may be insufficient to result in a path from that node changing for a particular destination. As a result various optimizations are available.

In order to identify possible optimizations, the causes of possible loops can be investigated further. One possible cause of a loop is when traffic is forwarded from a node, for example node A in FIG. 10 to an immediate (upstream) child in the reverse spanning tree for example node W whilst that node is still unaware of the cost change. Similarly if a node such as node A forwards traffic to an indirect (upstream) child, more than one hop away for example node V via another path this could result in a cyclic loop involving the newly used link and the existing links and nodes A and V within the spanning tree. Another alternative is where traffic is forwarded to a node which is neither a direct nor an indirect child but over a path which traverses a child node such as node W or node V which again could result in a cyclic loop if the nodes on the new path updated their FIBs in the incorrect order.

As a result, it will be seen that if a node in the reverse spanning tree would make no changes to any of its routes as a result of the cost change, then there is no need to control the time at which it updates its FIB. Similarly if a node in a reverse spanning tree would make changes to its routes, but none of those new routes traverse any (upstream) child node in the reverse spanning tree then no loops can take place and once again it is not necessary to time update of the FIB to avoid loops. In that case updating the FIB immediately can have the advantage of directing traffic along the new route straightaway rather than burdening any repair routes or tunnels that may have been installed closer downstream to the changed component.

Yet further, where a node branches to two or more child branches it is only necessary to consider any child branches containing a node which would be traversed by any new route. For any branch which does contain such a traversed node, it will be necessary to ensure that the nodes update their FIBs sequentially starting at the end of that branch as the furthest node, not just at the traversed node. Equal costs path splits would need to be taken into account, of course, in all of these instances as traffic could be sent equally along either or each equal cost path.

Yet a further optimization is to take into account the fact that different nodes send packets along different paths depending on the destination. As a result a node in the reverse spanning tree could update its FIB non-sequentially for packets for destinations not in the node's T space with respect to the link A, B, but sequentially for packets destined for a node in the T space. This can be achieved, for example, by keeping multiple FIB entries dependent on the packet destination. It will be appreciated that this approach could be refined yet further in relation to packets for different destinations within the T space. Dependent on the destination, for example, some packets would not traverse nodes in one or more child branches whilst for other destinations packets would traverse those nodes such that the update could be invoked at different times for packets for different respective destinations in the T space.

Figure 11:
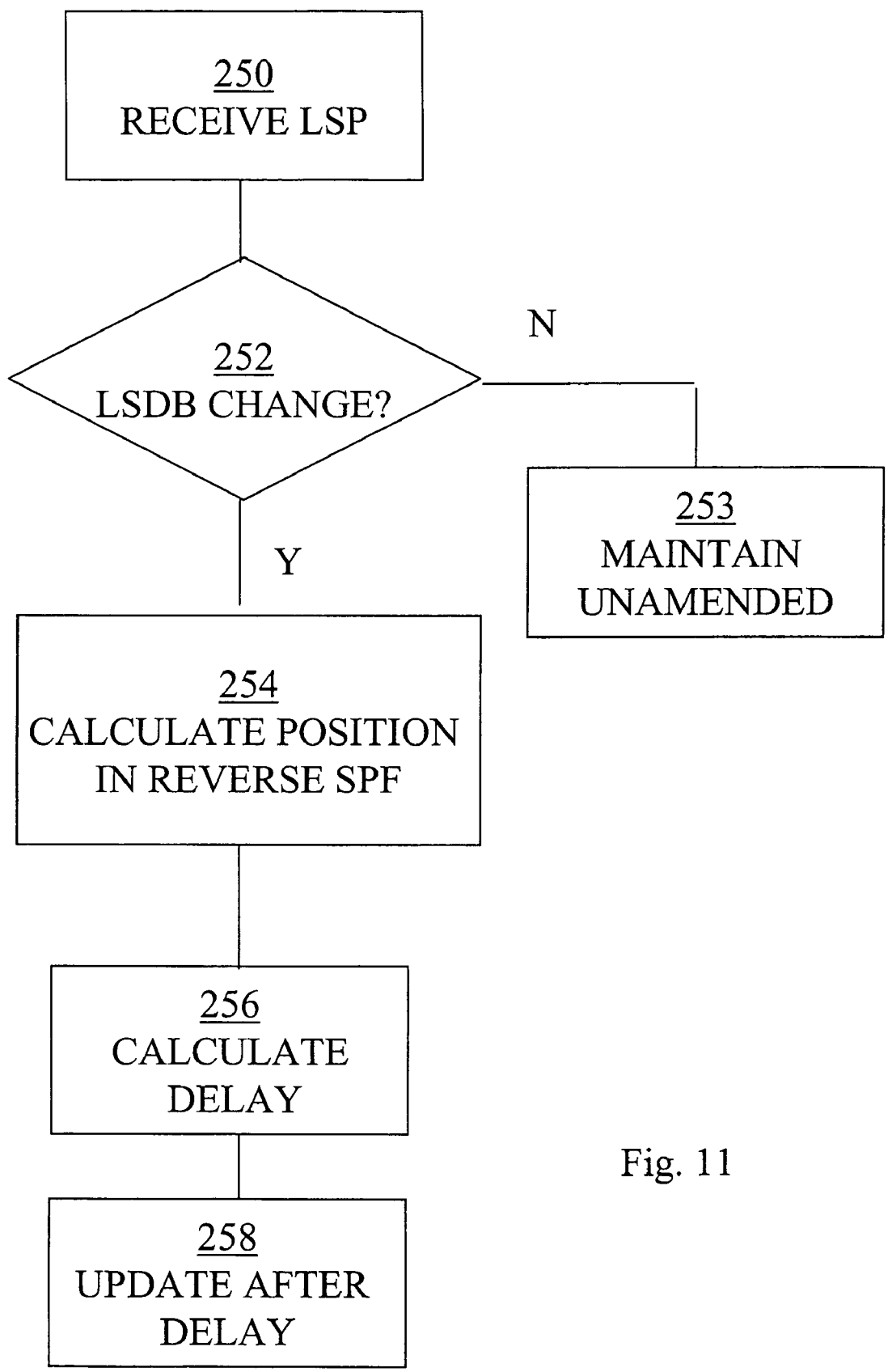
FIG. 11 shows a flow diagram illustrating in more detail the steps involved in implementing the method described herein.

Referring now to FIG. 11, which is a flow diagram illustrating in more detail the method, the various steps and optimizations discussed above can be further understood. In block 250 a node in the network receives an LSP representing a network change, for example the cost increase of a link between two remote nodes. At block 252 the node assesses whether any changes to its routes will be required as a result of the network change, for example by re-computing the LSP and comparing it with the existing situation. If there is no change then in block 253 the node simply retains the existing FIB. If, however, there is an LSDB change then in block 254 the node assesses where it is in the affected set, i.e. the reverse SPF rooted at the node the far side of the changed link (including equal cost path splits). The reverse SPF is run on the basis of the cost of the link prior to the change in the event of a cost increase. At block 256 the node calculates the delay before invoking the change and updating its FIB based on the revised LSDB. As discussed above, this is done by multiplying a predetermined delay by the maximum number of hops to the furthest most child node on the reverse spanning tree. In the case of FIG. 10, nodes V and F will update immediately as they are the furthest most nodes. Node W will update one predetermined delay thereafter as it is one hop away from the furthest most node, node V. Node A will update two predetermined delays after nodes V and F even though it is only one hop away from node F, in order to avoid any possible loops between nodes A and nodes W if they were to update at the same time.

In a typical system the predetermined delay will be based on a typical time to update an FIB—in the region of 500 milliseconds—plus an additional factor, for example 100 milliseconds, say for error. As the propagation time of the LSP is of the order of 10 milliseconds per hop, this propagation time is negligible in real networks compared to the FIB update time. However any appropriate delay can be selected for example by individual routers advertising their update time in which case the delay can be selected dependent on the specific delays of preceding routers, or the worst case delay. Further, the example times given herein are not critical and different times may be used, for example, as faster hardware is developed the typical times may be shorter, whereas for complex networks the times may be longer.

As discussed in more detail above various optimizations can be implemented by which the delay is shortened for example for branches to which a branch node cannot loop and it would further be possible to introduce different delays dependent on the packet destination.

In block 258 the node updates after the predetermined delay. As a result nodes update sequentially from the furthest node in the affected set towards the node closest to the network change such that loops cannot take place.

In an alternative approach, instead of calculating a predetermined delay a signaling approach can be instigated.

According to this approach the furthest most node will signal to its parent node in the reverse spanning tree once it has updated its FIB. At this point the parent node will update and send its own notification to its parent node (or nodes in the case of a path split) and so forth. At a branch node, the node will await signals from all its child nodes prior to updating. This can decrease the update time across the network and provide a versatile and reliable system but it will be appreciated that an additional signaling protocol needs to be implemented, of any appropriate type as will be familiar to the skilled reader.

In the case where repair paths are instituted upon network component change or failure, for example using tunnels around the failure as discussed in more detail in co-pending patent application Ser. No. 10/340,371 filed 9 Jan. 2003 entitled "Method and Apparatus for Constructing a Backup Route in a Data Communications Network" of Kevin Miles et al, ("Miles et al"), the entire contents of which are incorporated by reference for all purposes as if for the set forth herein, the method described above can be implemented and the repair paths removed after all nodes in the reverse spanning tree have updated their FIBs.

Although the discussion above with reference to FIGS. 8 to 11 is made with reference to a cost increase it will be appreciated that the method can equally be applied to a cost decrease of the type described with reference to FIGS. 1 to 7. In that case, however, the update progresses sequentially outwardly from the closest node to the failed component, for example node A in FIG. 10. In that case the reverse approach to that described with reference to FIGS. 8 to 11 is adopted such that node A updates immediately, nodes W and F one predetermined delay later and so forth. Once again equal cost path splits must be included in which case the worst case number of hops is adopted. In the case of equal cost path splits one way of ensuring that the delay at a node is the maximum, given that it may be reached by a different number of hops along each split path, is to select as the hop count the higher of the current count and one more than the count of any parent and such an approach applies equally in the cost increase case. Also, identifying whether nodes are affected is again based on the lowest cost version of the network which in this case is the version after the change.

It will be appreciated that the method described herein can be used on its own to avoid looping during network changes or in conjunction with either or both of the incremental cost change approach of Shand or the transition routes approach of Bryant.

The mechanism by which the method and optimizations discussed above are implemented will be well known to the skilled reader and do not require detailed discussion here. The forwarding node for example can identify a tunneled packet with destination of a neighbor node by examining the IP protocol type of a packet to determine that it is a tunnel packet, and observing that the destination address in the outer header is an immediate neighbor (from the routing protocol).

4.0 Implementation Mechanisms—Hardware Overview

Figure 12:
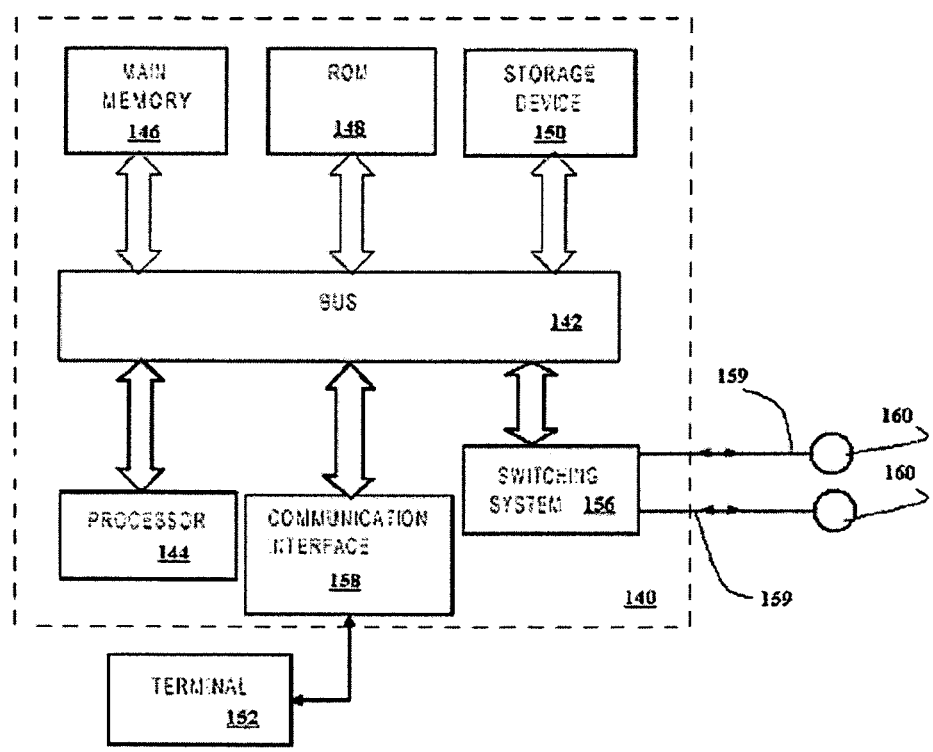
FIG. 12 is a block diagram that illustrates a computer system upon which an embodiment may be implemented.

FIG. 12 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 also may be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a node the above described method generating routing information. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, and volatile media. Non-volatile media includes, for example, optical or magnetic disks, such as storage device 150. Volatile media includes dynamic memory, such as main memory 146.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism can be adopted to implement the invention. The method steps set out can be carried out in any appropriate order and aspects from the examples and embodiments described juxtaposed or interchanged as appropriate.

It will be appreciated that any appropriate routing protocol can be used such as Intermediate System—Intermediate System (IS-IS) or Open Shortest Path First (OSPF). Similarly any appropriate network can provide the platform for implementation of the method.

The invention claimed is:

1. A method of generating routing information in a data communications network having, as elements, nodes and links, the method comprising the steps performed at a first network element of:
    receiving at the first network element information relating to a change in the network at a second network element,
    identifying a sequence in which updating of routing information at each element in the network should occur,
    for each network element in the network, computing a delay that is proportional to a number of hops from that network element to a furtherest upstream of its children multiplied by a configurable delay value, and
    after waiting for a time equal to the delay, updating the routing information at the first element in the sequence.

2. A method as claimed in claim 1, wherein the step of identifying sequence comprises:
    determining a new shortest path through the network from the first network element for each network element in the network; and
    after waiting for a time equal to the delay, updating routing information for the first network element based on the new shortest path for the first network element.

3. A method according to claim 2 wherein the delay for each network element in the network is proportional to the number of hops between the first network element and that network element.

4. A method according to claim 2 further comprising determining whether the information relating to the second network element indicates an increase in a cost metric for the second element.

5. A method according to claim 2 further comprising determining whether the information relating to the second network element indicates a decrease in a cost metric for the second element.

6. A method of generating routing information in a data communications network, the method comprising,
    receiving at a first network element information relating to a second network element;
    determining whether the information relating to the second network element indicates a change in the network;
    when information relating to the second network element indicates a change in the network, determining a new shortest path through the network from the first network element for each network element in the network;
    for each network element in the network, computing a delay that is proportional to a number of hops from that network element to a furtherest upstream of its children multiplied by a configurable delay value; and
    after waiting for a time equal to the delay, updating routing information for the first network element based on the new shortest path for the first network element.

7. An apparatus for generating routing information in a data communications network having as elements nodes and links, comprising means for receiving at a first network element information relating to a change in the network at a second network element, means for identifying a sequence in which updating of routing information at each element in the network should occur, means for computing for each network element in the network, a delay that is proportional to a number of hops from that network element to a furthest upstream of its children multiplied by a configurable delay value, and means for updating the routing information at the first element in the sequence after waiting for a time equal to the delay.

8. An apparatus as claimed in claim 7, wherein the means for identifying the sequence comprises:

determining a new shortest path through the network from the first network element for each network element in the network; and after waiting for a time equal to the delay, updating routing information for the first network element based on the new shortest path for the first network element.

9. An apparatus according to claim 8 wherein the delay for each network element in the network, is proportional to the number of hops between the first network element and that network element.

10. An apparatus according to claim 8, further comprising means for determining whether the information relating to the second network element indicates an increase in a cost metric for the second element.

11. An apparatus according to claim 8 further comprising means for determining whether the information relating to the second network element indicates a decrease in a cost metric for the second element.

12. An apparatus for generating routing information in a data communications network, the apparatus comprising:

means for receiving at a first network element information relating to a second network element;

means for determining whether the information relating to the second network element indicates a change in the network;

means for determining a new shortest path through the network from the first network element for each network element in the network when information relating to the second network element indicates a change in the network; and means for computing for each network element in the network, a delay that is proportional to a number of hops from that network element to a furthest upstream of its children multiplied by a configurable delay value, and means for updating routing information for the first network element based on the new shortest path for the first network element after waiting for a time equal to the delay.

13. An apparatus for generating routing information in a data communications network having, as elements, links and nodes, the apparatus comprising:

one or more processors;

a network interface communicatively coupled to the processor and configured to communicate one or more packet flows among the processor and a network; and a computer readable medium comprising one or more sequences of instructions for generating routing information which instructions, when executed by one more processors, cause the one or more processors to generate routing information in a data communications network having, as elements, nodes and links, performing the steps at a first network element of:

receiving at the first network element information relating to a change in the network at a second network element, identifying a sequence in which updating of routing information at each element in the network should occur, for each network element in the network, computing a delay that is proportional to a number of hops from that network element to a furthest upstream of its children multiplied by a configurable delay value, and after waiting for a time equal to the delay, updating the routing information at the first element in the sequence.

14. The apparatus of claim 13, wherein identifying the sequence comprises:

determining a new shortest path through the network from the first network element for each network element in the network; and after waiting for a time equal to the delay, updating routing information for the first network element based on the new shortest path for the first network element.

15. The apparatus of claim 14, wherein the delay for each network element in the network, is proportional to the number of hops between the first network element and that network element.

16. The apparatus of claim 14, further comprising determining whether the information relating to the second network element indicates an increase in a cost metric for the second element.

17. The apparatus of claim 14, further comprising determining whether the information relating to the second network element indicates a decrease in a cost metric for the second element.

18. An apparatus for generating routing information in a data communications network having, as elements, links and nodes, the apparatus comprising:

one or more processors;

a network interface communicatively coupled to the processor and configured to communicate one or more packet flows among the processor and a network; and a computer readable medium comprising one or more sequences of instructions for generating routing information which instructions, when executed by one more processors, cause the one or more processors to generate routing information in a data communications network, performing the steps comprising;

receiving at a first network element information relating to a second network element;

determining whether the information relating to the second network element indicates a change in the network;

when information relating to the second network element indicates a change in the network, determining a new shortest path through the network from the first network element for each network element in the network;

for each network element in the network, computing a delay that is proportional to a number of hops from that network element to a furthest upstream of its children multiplied by a configurable delay value; and after waiting for a time equal to the delay, updating routing information for the first network element based on the new shortest path for the first network element.

19. A computer readable storage medium storing one or more sequences of instructions for a data communications network having as elements links and nodes, which instructions, when executed by one or more processors, cause the one or more processors to generate routing information in a data communications network having, as elements, nodes and links, performing the steps at a first network element of:

receiving at the first network element information relating to a change in the network at a second network element, identifying a sequence in which updating of routing information at each element in the network should occur, for each network element in the network, computing a delay that is proportional to a number of hops from that network element to a furthest upstream of its children multiplied by a configurable delay value, and after waiting for a time equal to the delay, updating the routing information at the first element in the sequence.

20. The computer readable storage medium of claim 19, wherein the step of identifying the sequence comprises:

determining a new shortest path through the network from the first network element for each network element in the network; and after waiting for a time equal to the delay, updating routing information for the first network element based on the new shortest path for the first network element.

21. The computer readable storage medium of claim 20, wherein the delay for each network element in the network, is proportional to the number of hops between the first network element and that network element.

22. The computer readable storage medium of claim 20, further comprising determining whether the information relating to the second network element indicates an increase in a cost metric for the second element.

23. The computer readable storage medium of claim 20, further comprising determining whether the information relating to the second network element indicates a decrease in a cost metric for the second element.

24. A computer readable storage medium storing one or more sequences of instructions for a data communications network having, as elements, links and nodes, which instructions, when executed by one or more processors, cause the one or more processors to generate routing information in a data communications network, performing the steps comprising:

receiving at a first network element information relating to a second network element;

determining whether the information relating to the second network element indicates a change in the network;

when information relating to the second network element indicates a change in the network, determining a new shortest path through the network from the first network element for each network element in the network;

for each network element in the network, computing a delay that is proportional to a number of hops from that network element to a furthest upstream of its children multiplied by a configurable delay value; and after waiting for a time equal to the delay, updating routing information for the first network element based on the new shortest path for the first network element.

* * * * *

UNITED STATES PATENT AND TRADEMARK OFFICE
CERTIFICATE OF CORRECTION

PATENT NO.      : 7,554,921 B2                                    Page 1 of 2
APPLICATION NO. : 10/685622
DATED           : June 30, 2009
INVENTOR(S)     : Stefano Benedetto Previdi et al.

It is certified that error appears in the above-identified patent and that said Letters Patent is hereby corrected as shown below:

Title page, item (56) References Cited:
      U.S. Patent Documents
        Insert    -- 6,349,091 B *   2/2002 Li......... 380/286 --
                 -- 6,473,421 B * 10/2002 Tappan --
                 -- 6,507,577 B *   1/2003 Mauger et al. --
                 -- 2002/0171886 A   11/2002 Wu et al. --
                 -- 2005/0097219 A    5/2005 Goguen et al. --
                 -- 2004/0071089 A    4/2004 Bauer et al. --
                 -- 2004/0001497 A    1/2004 Sharma --
                 -- 6,714,551 B *   3/2004 Le-Ngoc --
                 -- 6,343,122 B *   1/2002 Andersson --
                 -- 2002/0112072 A    8/2002 Jain --
                 -- 6,295,275 B *   9/2001 Croslin --
                 -- 7,260,645 B *   8/2007 Bays --
                 -- 2003/0193959 A   10/2003 Lui et al. --
                 -- 6,111,257    8/2000   Shand et al. --
                 -- 2005/0007950 A     1/2005 Liu --
                 -- 5,959,968    9/1999   Chin et al. --
                 -- 7,058,016 B *   6/2006   Harper --
                 -- 6,690,671 B *   2/2004   Anbiah et al. --

Continued in Section (56) References Cited:
      Other Publications:
        Insert    -- CN-1440159A 3/2003 --
                 -- AU Examiner's First Report for foreign patent application no. 2004311004 dated 23 June 2008 (1 pg). --
                 -- AU Examiner's Second Report for foreign patent application no. 2004311004 dated 18 August 2008 (1 pg). --
                 -- Current claims for AU foreign patent application no. 2004311004 (6 pgs). --
                 -- Office Action from CN for foreign application no. 200480033007.8 dated 11 April 2008 (10 pgs) with English translation (11 pgs). --

Signed and Sealed this

Seventeenth Day of August, 2010

David J. Kappos
*Director of the United States Patent and Trademark Office*

-- Current claims for CN foreign patent application no. 200480033007.8 (6 pgs). --
-- State Intellectual Property Office of the People's Republic of China, "The First Office Action", (non-translated copy included as well), filing number 200480026214.0, dated January 9, 2009, 7 pages. --
-- Current claims, for foreign application number PCT/US2004/033827, 5 pages. --

Col. 16, claim 1, line 23 delete "furtherest" and insert -- furthest --.